United States Patent [19]

Cerwick

[11] 4,446,018
[45] May 1, 1984

[54] WASTE TREATMENT SYSTEM HAVING INTEGRAL INTRACHANNEL CLARIFIER

[75] Inventor: Joel A. Cerwick, Lenexa, Kans.

[73] Assignee: Armco Inc., Middletown, Ohio

[21] Appl. No.: 339,699

[22] Filed: Jan. 15, 1982

Related U.S. Application Data

[63] Continuation of Ser. No. 145,707, May 1, 1980, abandoned.

[51] Int. Cl.$^3$ .............................................. C02F 3/12
[52] U.S. Cl. .................................. 210/195.4; 210/207; 210/256; 210/521; 210/926
[58] Field of Search ............ 210/623, 629, 926, 195.3, 210/195.4, 207, 254, 256, 320, 521, 522

[56] References Cited

U.S. PATENT DOCUMENTS

| | | | |
|---|---|---|---|
| 1,247,542 | 11/1917 | Jones | 210/926 X |
| 2,868,384 | 1/1959 | Puddington | 210/521 |
| 3,472,764 | 10/1969 | Culp et al. | 210/195.4 |
| 3,563,389 | 2/1971 | Mizrahi et al. | 210/521 |
| 3,666,111 | 5/1972 | Pielkenrood et al. | 210/521 |
| 3,706,384 | 12/1972 | Weijman-Hane et al. | 210/519 |
| 3,794,167 | 2/1974 | Olgard et al. | 210/522 X |
| 3,846,292 | 11/1974 | LeCompte | 210/926 X |
| 3,849,311 | 11/1974 | Jakubek | 210/188 |
| 3,886,064 | 5/1975 | Kosonen | 210/522 X |
| 3,903,000 | 9/1975 | Miura et al. | 210/320 X |
| 3,914,175 | 10/1975 | Kunz et al. | 210/521 X |
| 3,953,332 | 4/1976 | Speth et al. | 210/521 X |
| 3,990,974 | 11/1976 | Sullins | 210/522 X |
| 4,056,477 | 11/1977 | Ravitts | 210/522 |
| 4,132,651 | 1/1979 | de Jong | 210/522 |
| 4,172,789 | 10/1979 | Huardeau | 210/522 X |
| 4,192,740 | 11/1980 | Savard et al. | 210/629 X |
| 4,226,717 | 10/1980 | Malm | 210/926 X |
| 4,303,516 | 12/1981 | Stensel et al. | 210/195.4 |
| 4,351,733 | 9/1982 | Salzer et al. | 210/521 X |

FOREIGN PATENT DOCUMENTS

| | | |
|---|---|---|
| 2379483 | 9/1978 | France . |
| 7606791 | 6/1970 | Netherlands . |
| 783969 | 6/1978 | South Africa . |
| 2004858 | 4/1979 | United Kingdom . |

OTHER PUBLICATIONS

"Tube Settling-Advanced Concepts in High-Rate Solids Removal", copyright 1975 Neptune Microfloc, Inc.
N. P. Cheremisinoff, "Lamella Gravity Settler: A Compct. Clarifier", *Pollution Engineering*, Mar. 1977.

*Primary Examiner*—Thomas G. Wyse
*Attorney, Agent, or Firm*—Frost & Jacobs

[57] ABSTRACT

An intrachannel clarifier for producing clarified waste liquid within an oxidation ditch aerobic wastewater treatment system. The clarifier comprises a tank-like construction positioned in the upper portion of the oxidation ditch channel and having an opening in an upstream wall for admitting mixed liquor at a relatively slow rate. The region within the clarifier establishes a quiescent zone where solids may settle from the waste liquid by gravity to the tank bottom. A portion of the clarified liquid is removed by means of an overflow weir or launder. The bottom of the clarifier forms a perforated baffle made up of a plurality of spaced parallel slightly overlapping inverted V-shaped angle members extending between the walls of the oxidation ditch channel. The spaces between the angle members permit settled solids to return to the mixed liquor flowing beneath the clarifier, but prevent movement of excessive quantities of mixed liquor into the quiescent zone. In a first embodiment, the clarifier is constructed as an integral part of the oxidation ditch. In a second embodiment, the clarifier is constructed as a separate unit which may be added to an existing oxidation ditch to provide retrofit intrachannel clarifier capability.

39 Claims, 8 Drawing Figures

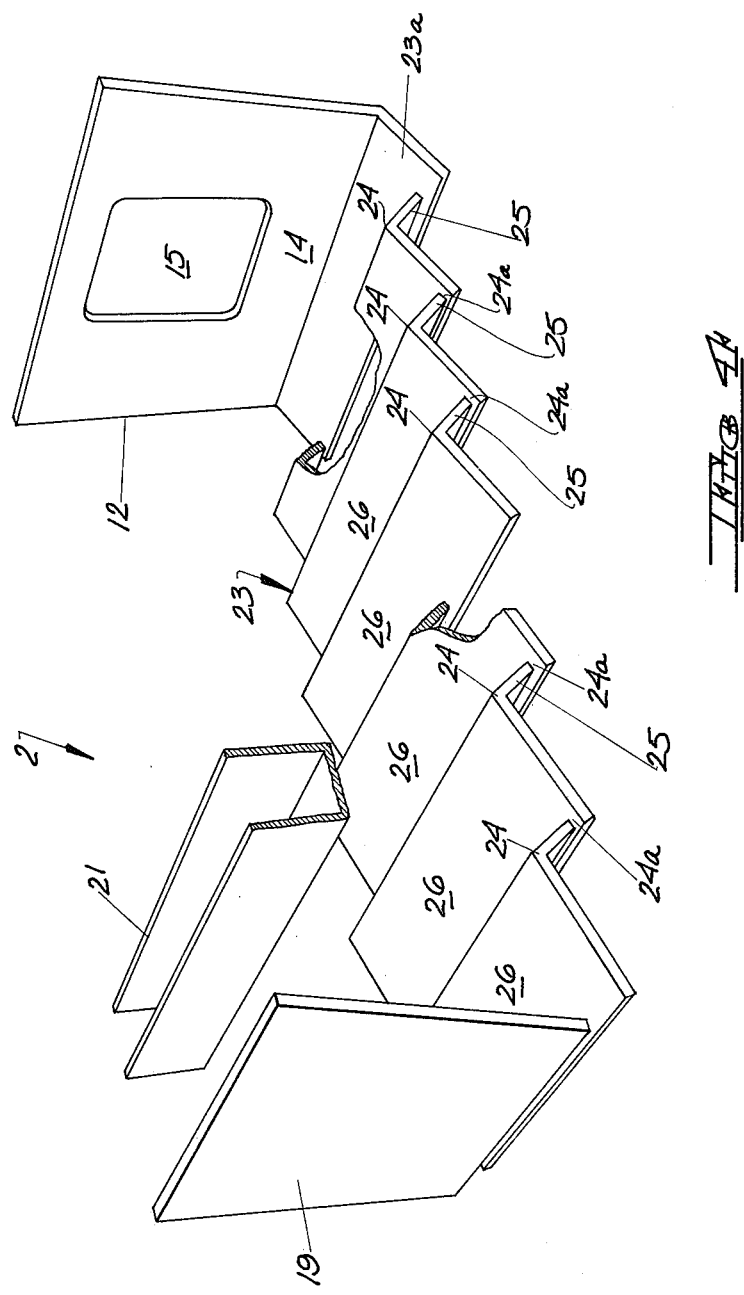

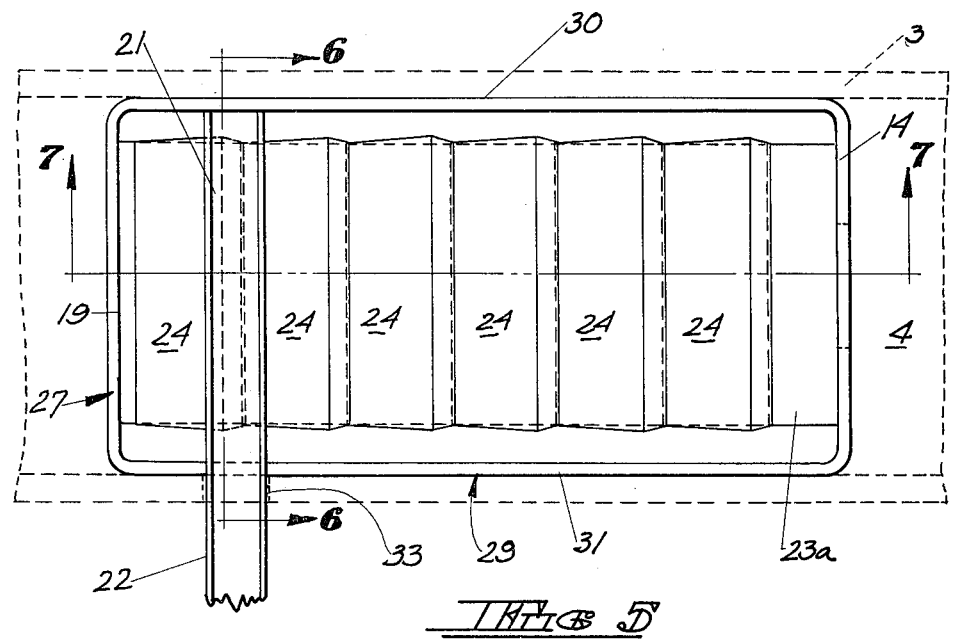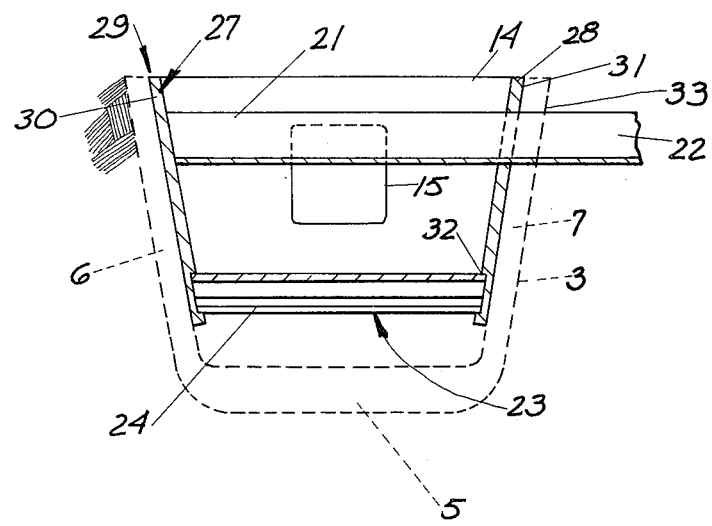

WASTE TREATMENT SYSTEM HAVING INTEGRAL INTRACHANNEL CLARIFIER

SUMMARY OF THE INVENTION

The present invention relates generally to a waste water treatment system, and more particularly to aerobic waste water treatment systems of the type using an oxidation ditch system including an intrachannel clarifier positioned within the oxidation ditch channel.

Generally, waste treatment systems may be divided into two types of broad categories. The first category involves waste waters containing organic and inorganic dissolved and suspended solids which are amenable to chemical treatment and subsequent clarification, as by oxidation, reduction, neutralization, and the like. A sludge is usually formed which is separated by holding under quiescent conditions, usually for a considerable length of time, in a settling tank, where the inorganic solids settle by gravity to the bottom of the tank. The settled sludge must be removed by mechanical means, and the remaining waste liquor may require chemical neutralization for disposal. The sludge material may be disposed of in a number of different ways as is well known in the art. The waste water may be recycled or discharged to a public waterway. A common source of such waste liquids are pickle acids or pickling rinse waters resulting from steel plant operations.

The present invention is concerned with the general broad category of waste materials which contain biodegradable solids. Such waste liquids may result from municipal sewage collection systems, oil refineries, coke plants, paper making plants, canneries, food processing plants and the like. The treatment of these organic dissolved and suspended materials is normally accomplished by aerobic processes commonly classified as biological treatment. Removal of the organic material by these processes is accomplished by two general mechanisms. First, impurities are adsorbed and absorbed at the interface between the associated biomass and waste liquid. Second, the biomass decomposes these organics through oxidation, the synthesizing new cells and releasing gases such as carbon dioxide. The resulting increased biomass or sludge consisting of accumulated micro-organisms is generally separated from the organically stabilized liquid. While most of the biomass is generally returned to the process to continue the process, excess sludges are normally wasted from the system.

In conventional aerobic treatment systems, the major components are frequently an aeration tank and a clarifier. In one type of treatment system, the aeration tank is rectangular or circular, and includes means for continually circulating the waste liquid within the tank with the addition of oxygen or air to promote micro-organism growth. In a second type of aeration tank, the tank is generally oval in shape and defines a trough-like channel having a bottom and spaced upstanding sidewalls for retaining the waste liquid in a continuous substantially closed flow path. In this type of system, which is often referred to as an oxidation ditch, the waste liquid is continuously circulated by means of rotating brushes, discs, turbines or the like, at a flow velocity sufficient to maintain the solids in suspension. Additional air or oxygen may also be added to the circulating waste liquid to promote micro-organism growth.

Both types of systems require a clarifier for separating suspended solids from the waste liquid, commonly referred to as mixed liquor, and disposing of the clarified liquid. In conventional oxidation ditch systems, the clarifier comprises a separate unit frequently located adjacent an outside edge of the aeration channel, which forms a settling tank for separating suspended solids from the waste liquid. The clarified liquid may be disposed of or reused, while the settled biomass remains in the clarifier, where it may be disposed of as waste sludge, or recycled to the oxidation ditch to maintain the proper balance between organic loading and biological microbial mass solids in the mixed liquor.

Periodically, the settled sludge in the clarifier must be removed by mechanical means such as scrapers, pumps or the like. As noted, a portion of the sludge may be returned to the oxidation ditch for further digestion. In any event, it has been found that the use of such a separate clarifier tank not only requires significant installation and material costs together with land space for the clarifier installation, but also a significant expenditure of energy resources to remove the settled sludge from the clarifier, as well as to move the sludge between the oxidation ditch and the clarifier.

The present invention significantly reduces equipment and energy requirements associated with aerobic waste treatment facilities of the type described by incorporating the clarifier within the oxidation ditch flow channel. While for purposes of an exemplary showing, the intrachannel clarifier of the present invention has been described and illustrated in connection with an oxidation ditch treatment system, it will be understood the inventive principles may be extended to other aeration tank configurations. In the embodiment described, the intrachannel clarifier is positioned downstream from the aeration means or means for imparting a flow velocity to the liquid. A portion of the mixed liquor being circulated in the oxidation ditch is allowed to pass into the clarifier zone. Once within the quiescent zone established inside the clarifier, suspended solids settle by gravity to a specially constructed clarifier bottom. Consequently, liquid-solid separation occurs as it would in a conventional rectangular sedimentation basin with the clarified supernatant being discharged over an effluent weir. The majority of the mixed liquor being circulated in the oxidation ditch does not enter the quiescent clarification zone, but rather passes beneath it at sufficient velocity to maintain solids in suspension. As the mixed liquor passes beneath the clarifier, sludge is hydraulically drawn from the clarifier bottom and resuspended in the mixed liquid. Sludge is wasted from the system by wasting a stream of mixed liquor.

In a preferred embodiment, the intrachannel clarifier comprises tank means for creating a zone of relatively quiescent waste liquid in the upper portion of the oxidation ditch channel to permit suspended solids to settle downwardly by gravity within the quiescent zone to produce clarified waste liquid. The tank means include a vertically positioned upstream wall within the flow path of the channel, and may include an opening forming a clarifier inlet extending through the wall permitting entry of unclarified mixed liquor from the flow path into the quiescent zone at a relatively slow rate. A second vertically positioned wall is placed downstream from the upstream wall within the flow path of the channel, both walls being positioned to permit waste liquid flow between the lower edges of the walls and the channel bottom. The channel walls serve as side walls to the quiescent zone in the case where the upstream and downstream walls extend completely across the channel path. However, additional vertically positioned side walls may be required where the upstream and downstream walls extend only partially across the flow path of the channel as will be explained in detail hereinafter. The channel bottom may also include a deepened portion extending between the walls to facilitate waste liquid flow as will also be explained in more detail hereinafter.

Clarifier outlet means formed by an overflow weir or launder positioned within the tank removes a portion of the clarified waste liquid for disposal of reuse.

The tank bottom is constructed in the form of baffle means for permitting the settled solids to return from the quiescent zone to the flowing mixed liquor within the channel, while preventing movement of excessive quantities of flowing mixed liquor into the quiescent zone. The baffle means includes a plurality of spaced parallel overlapping inverted V-shaped angle members having a pair of angularly disposed legs extending between the channel walls in spaced parallel relationship with the channel bottom. The downstream leg of each angle member is longer in the flow direction than the upstream leg. Adjacent legs of adjoining angle members are arranged and spaced to permit the passage of settled solids between the angle members. The angle members are disposed within the tank such that the upper surfaces of the legs are inclined at angles of approximately 30°–60° with respect to the horizontal to prevent collection of settled solids on the angle members. It is believed that the angle members tend to create a draft for hydraulically drawing settled solids from the clarifier tank into the waste liquid underflow.

In a second embodiment, the intrachannel clarifier is constructed in the form of a tank of similar construction to that described hereinabove positionable within an existing oxidation ditch channel, thereby permitting retrofitting of established waste treatment systems. In this embodiment, the tank is constructed to be positioned at approximately mid-depth within the oxidation ditch channel thereby permitting underflow of the flowing mixed liquor to draw settled solids through the slatted tank bottom.

In either configuration, sludge is wasted from the system by wasting a stream of mixed liquor at a location downstream from the intrachannel clarifier.

Further features of the invention will become apparent from the detailed description which follows:

BRIEF DESCRIPTION OF THE DRAWING

FIG. 4 is a fragmentary perspective view of the intrachannel clarifier of the present invention.

FIG. 5 is a fragmentary top plan view of a second embodiment of the intrachannel clarifier of the present invention.

FIG. 6 is a fragmentary cross sectional view taken along section line 6—6 of FIG. 5.

DETAILED DESCRIPTION

Figure 1:
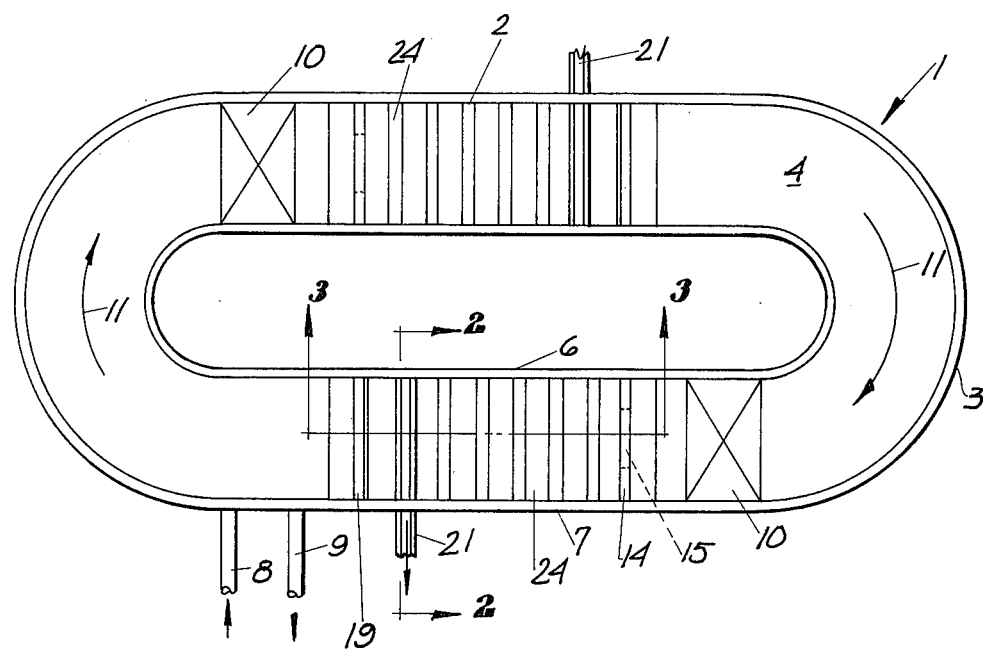
FIG. 1 is a partially schematic top plan view of a typical oxidation ditch waste treatment system incorporating the intrachannel clarifier of the present invention.
Figure 2:
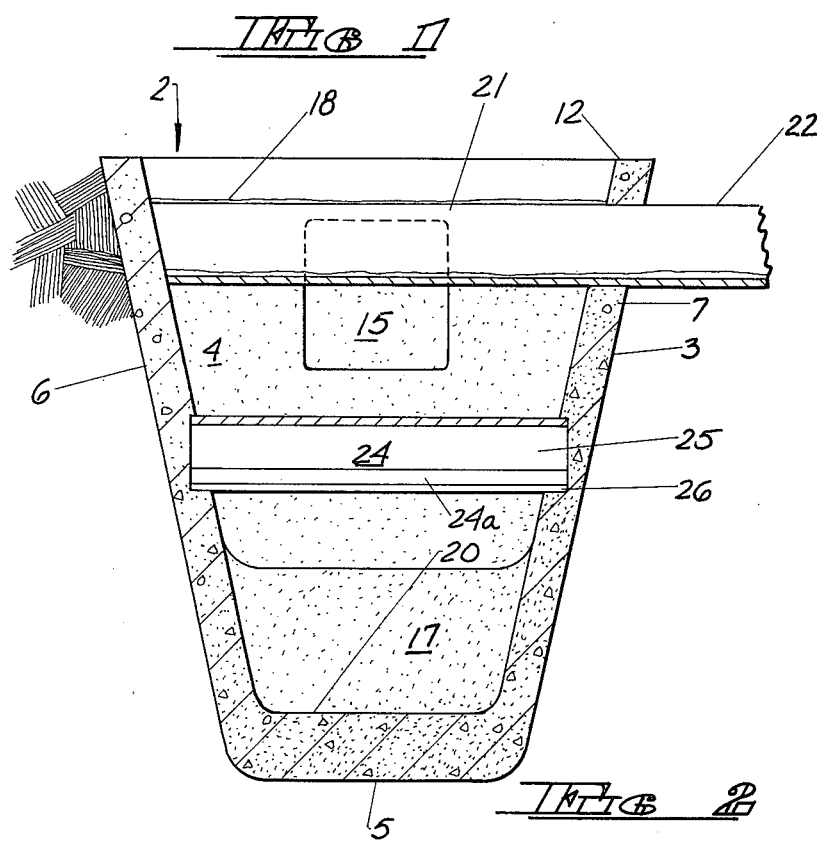
FIG. 2 is a fragmentary cross sectional view taken along section line 2—2 of FIG. 1.

An oxidation ditch waste treatment system, shown generally at 1, incorporating a pair of intrachannel clarifiers of the present invention, shown generally at 2, is illustrated in FIG. 1. While for purposes of an exemplary showing, the intrachannel clarifier is described and illustrated in connection with an oxidation ditch type of waste treatment system, it will be understood that the inventive principles of the present invention may be applied to any type of waste treatment system where the waste liquid is treated in an aeration tank configuration. The waste treatment system 1 illustrated in FIG. 1 comprises an oval or race track-shaped oxidation ditch 3 defining a trough-like channel 4 having a bottom 5 and spaced upstanding side walls 6 and 7 for retaining the waste liquid in a continuous substantially closed flow path. Channel walls 6 and 7 may be positioned vertically, or slanted outwardly as illustrated in FIG. 2 such that the flow channel is wider at the top than at the bottom. Oxidation ditch 3 may be constructed from any suitable material such as earth, concrete, fiberglass, steel or the like, and may be embedded in the ground to facilitate construction of the channel. Means are provided in the form of a pipe or conduit 8 for introducing waste water influent into the oxidation ditch flow path. In the embodiment illustrated, inlet conduit 8 is positioned near the end of oxidation ditch 3, downstream from interchannel clarifier 2. Similarly, means in the form of an outlet conduit 9 are provided for removing waste sludge from the flow path by wasting a stream of mixed liquor. In the embodiment illustrated, outlet conduit 9 is positioned on the outer edge of oxidation ditch 3 between inlet conduit 8 and intrachannel clarifier 2. However, it will be understood that both the inlet and outlet conduits may be positioned at other locations on the oxidation ditch as required.

Means 10 are provided for aerating and moving the waste liquid in a single substantially horizontal direction in the flow path as indicated by directional arrows 11 at sufficient velocity to prevent settling of the suspended solids. As illustrated in FIG. 1, moving means 10 are provided spaced from the upstream edge of each intrachannel clarifier 2. In general, for waste liquid resulting from municipal sewage operations and the like, the flow velocity provided by moving means 10 will be approximately one foot per second in order to maintain adequate solid suspension. In any event, it is preferred that moving means 10 be sufficiently spaced from intrachannel clarifier 2 to prevent agitation of the settling solids in the quiescent zone of the clarifier as will be described in more detail hereinafter.

Moving means 10 may comprise any one of a number of different types of aerators or pumping mechanisms. For example, the moving means may be implemented by a plurality of brush-like bristles or slotted discs attached to a slowly rotating horizontal shaft extending transversely of the oxidation ditch channel in contact with the waste liquid, which agitates and aerates the waste liquid, and at the same time imparts a velocity vector to create unidirectional flow. Alternatively, the moving means may comprise a turbine for creating waste liquid flow and aerating the liquid to enhance the growth of micro-organisms. The moving means may also be implemented by means of ejectors directed in the direction of desired flow for aerating and agitating the waste liquid.

The oxidation ditch waste treatment system described hereinabove is essentially conventional in nature, and well understood by those skilled in the art. However, as noted hereinabove, such systems generally require the use of a separate clarifier for separating solids from the mixed liquor. To eliminate the problems associated with such separate settling or clarifying tanks, the present invention utilizes an intrachannel clarifier 2 positioned within the flow channel of the oxidation ditch. While the embodiment of the invention illustrated in FIG. 1–FIG. 4 utilizes two intrachannel clarifiers positioned within the oxidation ditch, it will be understood that the system may be operated with but one intrachannel clarifier, such as that illustrated in connection with the cross sectional views illustrated in FIG. 2 and FIG. 3. Likewise, it will be understood that the system may be operated with more than two intrachannel clarifiers.

Figure 3:
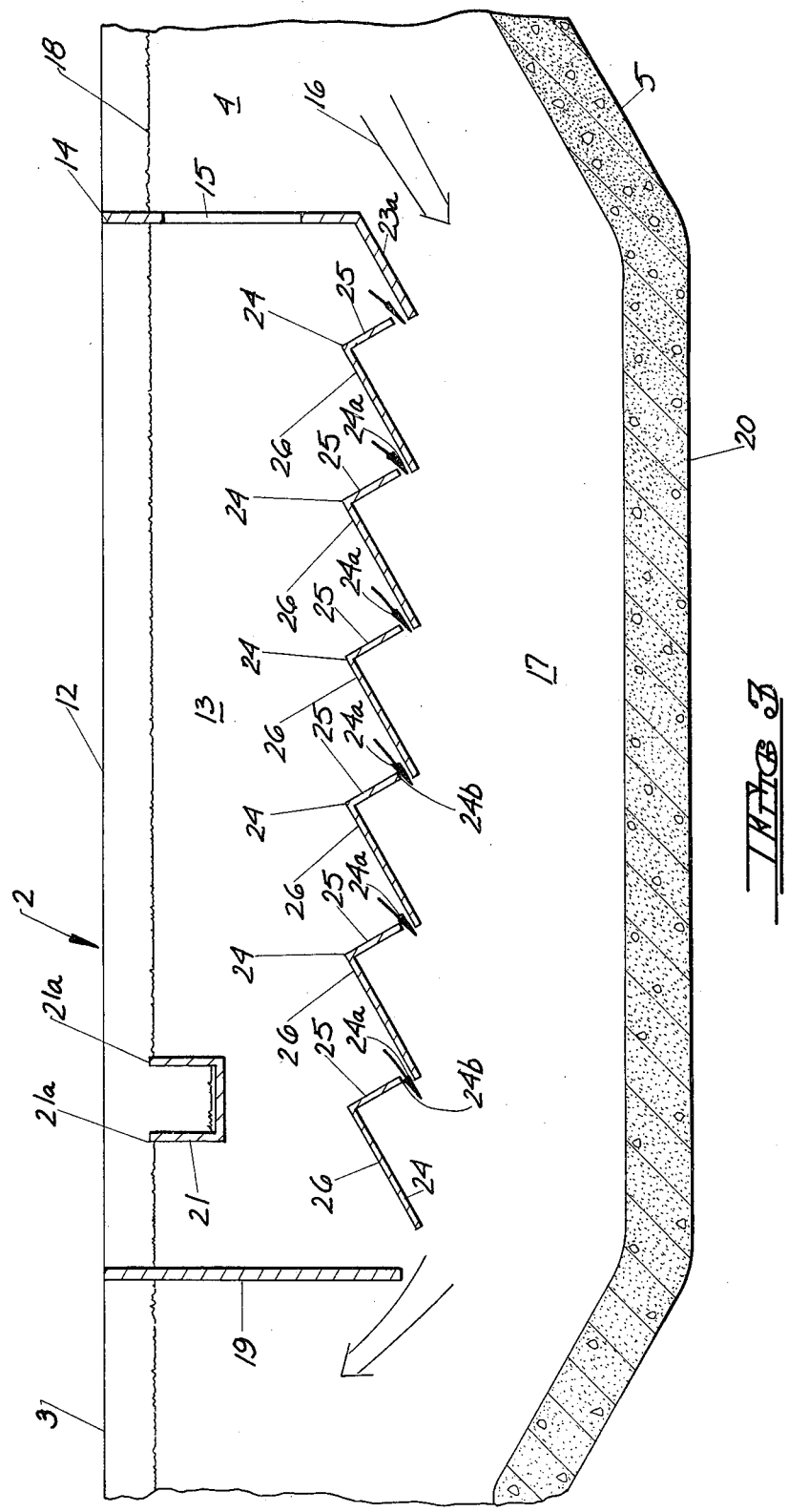
FIG. 3 is a fragmentary cross sectional view taken along section line 3—3 of FIG. 1.

In the embodiment of FIG. 1–FIG. 3, intrachannel clarifier 2 comprises tank means 12 for creating a zone 13 (see FIG. 3) of relatively quiescent waste liquid in the upper portion of channel 4 to permit suspended solids to settle downwardly by gravity within the quiescent zone to produce clarified waste liquid. It will be understood that tank means 12 may be constructed as an integral part of the oxidation ditch channel, or provided as a separate unit to retrofit existing waste treatment facilities as will be described in more detail hereinafter.

Tank means 12 includes a vertically positioned upstream wall 14 extending completely across the flow path within channel 4 to a depth of approximately one-half to three-quarters of the channel depth. Wall 14 may be constructed of concrete, steel, fiberglass or the like, and may be formed as an integral part of the channel as illustrated in the embodiment of FIG. 1–FIG. 4, or may be bolted or otherwise secured to the inner surfaces of channel walls 6 and 7, respectively. It will be understood that wall 14 need not extend completely across the flow path, but that additional side walls would be required in that case as will be explained more fully hereinafter.

Upstream wall 14 contains a generally rectangular central opening 15 extending through the wall permitting entry of unclarified waste liquid from the flow path into quiescent zone 13 at a relatively slow rate. It will be observed that upstream wall 14 and associated opening 15 cause the majority of the waste liquid to flow beneath the lowermost edge of wall 14 as illustrated by flow path arrow 16 to form the intrachannel clarifier underflow 17. In general, clarifier inlet 15 will be positioned below the upper surface 18 of the waste liquid. As will be explained in more detail hereinafter, in some situations it may be desirable to eliminate opening 15, such that unclarified waste liquid enters the quiescent zone through the perforated or slotted floor of the clarifier.

In the embodiment illustrated the terminal end of clarifier 2 is formed by a vertically positioned wall 19, similar in construction and shape to upstream wall 14, spaced downstream from the upstream wall, and extending completely across the flow path within channel 4. In general, the lower edges of walls 14 and 19 will extend to approximately the same depth within channel 4. It will be observed that this arrangement restricts the majority of waste liquid flow to the region beneath clarifier 2. It is believed that liquid flow in the underflow area 17 will generally be turbulent in nature. In any event, it will be desirable to maintain the flow velocity at a sufficient level to insure suspension of solids in the underflow area to prevent accumulation of sludge on the upper surface of channel bottom 5 in the underflow area. For liquid waste associated with municipal sewage facilities, it is believed that a flow velocity in the underflow area of no less than one foot per second should be sufficient to maintain solid suspensions. However, the actual flow velocity may depend somewhat on the particular type of liquid being treated, and the nature of the suspended solids.

As best shown in FIG. 3, the channel bottom 5 in the region of the underflow area may be deepened as at 20 to facilitate waste liquid flow. This deepened portion insures that the flow velocity of the liquid waste is not affected to any appreciable extent by the restrictions presented by walls 15 and 19.

Deepened portion 20 may also be utilized to affect the hydraulic performance of the clarifier bottom as will be described in more detail hereinafter.

In order to remove clarified liquid, clarifier 2 is provided with clarifier outlet means 21 comprising a trough-like overflow weir or launder positioned within the clarifier and extending between channel walls 6 and 7. As best shown in FIG. 3, the upper edges 21 a of clarifier outlet means 21 are positioned slightly below the upper surface level 18 of the waste liquid, so that the weir removes a portion of the supernatent. Weir 21 extends through channel wall 7 as at 22, to conduct the clarified liquid to a suitable disposal site (not shown). While an overflow weir or launder has been illustrated as the clarifier outlet means for purposes of an exemplary showing, it will be understood that other types of apparatus may be utilized for removing the clarified liquid from within clarifier 2.

The floor or bottom of clarifier 2 comprises baffle means, shown generally at 23, for permitting the settled solids to return from quiescent zone 13 to the flowing mixed liquor within underflow area 17, but preventing movement of excessive quantities of flowing mixed liquor into the quiescent zone. In a preferred embodiment, the baffle means forms a perforated or slotted bottom comprising a plurality of spaced parallel slightly overlapping inverted V-shaped angle members, one of which is shown at 24, having angularly disposed upstream and downstream legs 25 and 26, respectively. Angle members 24 extend between channel walls 6 and 7 in spaced parallel relationship with channel bottom 5, and may be integrally cast with the channel walls as illustrated in FIG. 2, or attached to the inner surfaces of the walls by any convenient means. Alternatively, slots may be provided in the inner surfaces of the channel walls for supporting the ends of the angle members in the proper orientation. As best shown in FIG. 3, the upstream leg 25 of the adjacent angle member 24 overlaps the upper surface of plate member 23a.

It will be observed that this arrangement forms a plurality of spaced sloping surfaces extending across the flow path. In general, angle members 24 may be constructed of steel, fiberglass or other material having generally smooth surfaces permitting settled solids to slide easily downwardly along the sloping surfaces into the underflow region. In some instances, the angle members may be replaced by a plurality of parallel spaced slanted plates extending between and supported by the channel walls. In either event, the baffle means acts as a baffle to preclude interruption of the quiescent zone by waste liquid flowing in the underflow area by diverting water away from the openings 24a between the baffle surfaces. In addition, it is believed the sloped surfaces form a draft caused by the flowing mixed liquor in the underflow area tending to suck or draw the settled sludge from the quiescent zone as indicated by directional arrows 24b in FIG. 3.

To obtain these objectives, the downstream leg 26 of each angle member is longer in the flow direction than the upstream leg 25, the legs being angularly disposed with respect to each other. Adjacent legs of adjoining angle members are also angularly disposed and spaced to permit the passage of settled solids in the space between the adjacent leg members. As best shown in FIG. 3, the upstream leg overlaps the downstream leg of an adjoining angle member. In the preferred embodiment illustrated, the angle members are disposed such that the upper surfaces of the upstream and downstream legs are inclined at angles of approximately 30°–60° with respect to the waste liquid flow to prevent collection of settled solids on the surfaces of the angle members. It is also believed that this angular orientation is necessary to create a draft for drawing settled solids from the clarifier into the underflow area, much in the manner of an aspirator.

To insure a substantially continuous bottom forming baffle means 23, a baffle plate member 23a extending downwardly at an angle of 30°–60° may be provided at the lower edge of upstream wall 25. In general, plate member 23a will be similar in construction and orientation to downstream legs 26 of angle members 24.

It will be observed that this arrangement of the baffle means 23 permits settling of the suspended solids to the clarifier bottom by gravity. The sloping surfaces in the bottom prevent deposition of the settled solids on these surfaces, as well as serving to channel the sludge to the open root of the multiple V configurations formed by adjacent angle members. As the mixed liquor passes under the clarifier, it is believed that sludge is hydraulically drawn from the V-shaped bottoms and resuspended in the mixed liquor passing under the clarifier.

It will be understood that various changes in the details, materials, steps and arrangements of parts, which have been herein described and illustrated in order to explain the nature of the invention, may be made by those skilled in the art within the principle and scope of the appended claims. For example, it may be desirable in some installations to eliminate or severely restrict the size of the opening forming clarifier inlet 15 in upstream wall 14. In this configuration, a portion of the mixed liquor bearing settable solids flowing in the underflow area 17 passes through the slots or spaces 24a between adjacent angle members 24 into quiescent zone 13. Since the flow velocity within the quiescent zone is insufficient to maintain solid suspensions, the solids settle from the mixed liquor and move downwardly into the underflow liquid. The clarified liquid is then removed by means of the overflow wier forming clarifier outlet means 21 in the manner described hereinabove.

Similarly, downstream wall 19 can be eliminated in some situations provided the flow velocity within quiescent zone 13 is less than that necessary to suspend settable solids. In this modification, it may be necessary to restrict the size of the opening forming clarifier inlet 15 in order to restrict the waste liquid flow velocity below the critical value necessary to suspend settlable solids. In all other respects, operation of clarifier 2 is identical to that described hereinabove.

Operation of the clarifier may also be affected by modification of the channel bottom in the area adjacent the clarifier underflow. As described hereinabove, the channel is provided with a deepened channel area 20 to prevent restriction of the waste liquid flow and possible reduction in the flow velocity which might cause settlable solids to accumulate as sludge on the floor of the channel in the underflow area. However, in some situations it may be desirable to slightly restrict the flow velocity, thereby causing a head loss between the upstream and downstream boundries of the baffle means 23 to assist in drawing settled solids from the quiescent zone. However, in this situation, the decrease in cross sectional area of the underflow will be insufficient to cause the velocity to fall below a level capable of maintaining settlable solids in suspension.

As an alternative to providing a deepened channel area 20 in the underflow region, the entire oxidation ditch channel could be widened in the region of clarifier 2 in order to increase the cross sectional area of the underflow thereby maintaining the flow velocity substantially constant. This alternative may be advantageous when the nature of the settlable solids is such that excessive sludge could tend to accumulate in the deepened channel area 20 in the configuration illustrated in FIG. 3, for example, or where extensive clarifier surface area is required.

Figure 7:
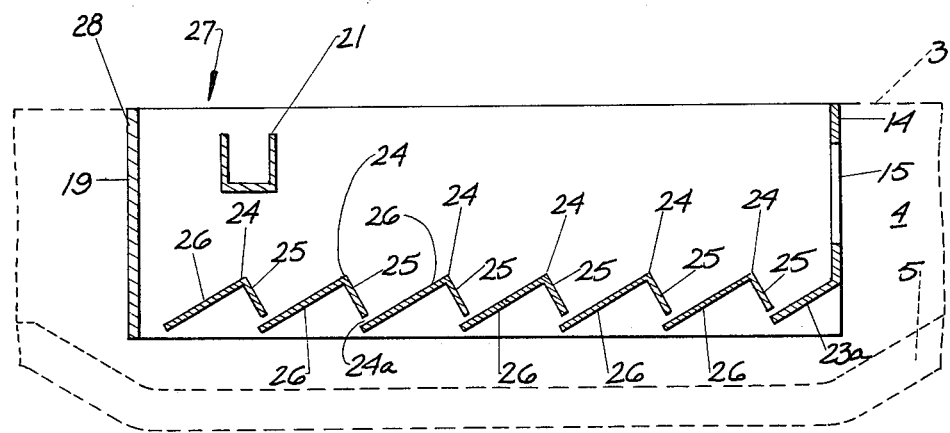
FIG. 7 is a fragmentary cross sectional view taken along section line 7—7 of FIG. 5.

Another embodiment of the present invention is illustrated in FIG. 5–FIG. 7, where elements similar to those described hereinbefore in connection with the embodiment of FIG. 1–FIG. 3 have been given similar reference designations.

This embodiment illustrates an intrachannel clarifier 27 constructed as a separate unit which can be added to existing oxidation ditch waste treatment systems. Fundamentally, clarifier 27 is similar in construction and operation to intrachannel clarifier 2 described hereinbefore, and comprises tank means 28 positionable within oxidation ditch channel 4 for creating a zone of relatively quiescent waste liquid 13 in the upper portion of the channel to permit suspended solids to settle downwardly by gravity within the quiescent zone to produce clarified waste liquid. Tank means 28 includes a vertically positioned upstream wall 14 configured to extend completely across the flow path within channel 4 when clarifier 27 is in place. An opening 15 forming a clarifier inlet extends through wall 15 to permit entry of unclarified waste liquid from the flow path into quiescent zone 13 at a relatively slow rate. As described hereinabove, opening 15 may be eliminated in certain designs. Furthermore, tank means 28 may be dimensioned to extend only partially across the flow path within channel 4.

A vertically positioned wall 19 is spaced downstream from upstream wall 14, and is also configured to extend across the flow path within channel 4 when the clarifier is in place. Both walls are vertically dimensioned to permit waste liquid flow between the lower edges of the wall and the channel bottom 5. As noted above, downstream wall 19 may also be eliminated for particular design configurations.

Baffle means 23 forming the bottom of tank means 28 permit the settled solids to return from quiescent zone 13 to the waste liquid underflow, but prevent infiltration to any great degree of flowing waste liquid into the quiescent zone. As described hereinabove, baffle means 23 comprises a plurality of spaced parallel slightly overlapping inverted V-shaped angle members, one of which is shown at 24, having a pair of angularly arranged upstream and downstream legs, 25 and 26. The angle members 24 are arranged in spaced parallel relationship with the channel bottom 5 when clarifier 27 is positioned within the channel. As noted above, the downstream leg 26 of each angle member 24 is longer in the flow direction than and angularly disposed with respect to upstream leg 25, adjacent legs of adjoining angle members being angularly disposed and spaced as at 24a to permit the passage of settled solids therebetween. The angle members are generally disposed such that the upper surfaces of each leg are inclined at angles of approximately 30°-60° with respect to the horizontal to prevent collection of settled solids. However, as noted above, the particular orientation of the angle member leg surfaces will depend somewhat upon the particular type of solids suspended in the mixed liquor, particularly, the angle of repose of the solids, etc. In any event, it is believed that the angle members tend to create a draft for drawing solids from the clarifier means 27 when the tank means is positioned within channel 4. To insure a substantially continuous bottom forming baffle means 23, a baffle plate member 23a extending downwardly at an angle of 30°-60° may be provided at the lower edge of upstream wall 25. In general, plate member 23a will be constructed and oriented as described hereinabove with respect to the embodiment of FIG. 1–FIG. 3.

In order to form tank means 28 as an integral unit which can be added to existing oxidation ditch waste treatment systems to provide retrofit clarifying capability, means 29 are provided for structurally connecting upstream and downstream end walls 14 and 19, respectively, with baffle means 23. In a preferred embodiment, connecting means 29 comprises generally vertical spaced inner and outer side walls 30 and 31, respectively. Side walls 30 and 31 extend between and are attached to the vertical edges of upstream and downstream walls 14 and 19 in order to form a generally rectangular box-like tank. The side and end walls may be separately fabricated and attached by any convenient means, or molded or cast in one piece. This latter mode of construction is particularly advantageous when tank means 28 is constructed from concrete, fiberglass or the like.

The inner and outer edges of angle members 24 are secured to the inner surfaces of side walls 30 and 31 as at 32 as shown in FIG. 6 by any convenient means. Alternatively, angle members 24 may be cast or molded as an integral part of the side and end walls, or may rest in grooves or slots provided in the inner surfaces of the side walls. For example, tank means 28 may be constructed entirely of concrete or fiberglass, for example, in one continuous casting operation to include baffle means 23 forming the floor of the box-like tank.

In a similar manner, clarifier outlet means 21 in the form of a channel-like weir or launder may be positioned within the tank means for removing a portion of the clarified mixed liquor in a manner similar to that described hereinbefore with respect to the embodiment of FIG. 1–FIG. 3. In the present embodiment, the outer end 22 of clarifier outlet means 21 extends through outer side wall 31. In addition, a cut or opening 33 may be provided in the outermost channel wall 7 of oxidation ditch 3 to accommodate the extension 22 of the clarifier outlet means. It will be understood that the weir or launder may be provided as a separate assembly attached by means not shown to tank means 28, or may be cast or molded as an integral part of the box-like tank.

As best shown in FIG. 6, side walls 30 and 31 taper inwardly and downwardly to conform to the shape of channel walls 6 and 7, respectively. In such a configuration where the oxidation ditch channel cross section is trapezoidal-shaped, the intrachannel clarifier 27 will remain positioned in and supported by channel 4 as illustrated in FIG. 6 by its own weight without additional attaching means. In situations where the channel walls are more nearly vertical, or of other shapes, additional fastening means such as bolts or the like may be necessary to hold clarifier 27 in place within the channel to insure that baffle means 23 is positioned at the proper distance above channel bottom 5. It will be further understood that the channel bottom may be deepened as illustrated at 20 in FIG. 3 in the area of the clarifier to facilitate removal of settled solids from within quiescent zone 13.

It will be further understood that baffle means 23 may be connected to either or both of upstream end wall 14 or downstream wall 19 by other means. For example, the side walls 30 and 31 may be eliminated entirely, and the individual angle members 24 attached to each other by suitable means to maintain spaces 24a between the angle members, with the endmost angle members being attached to the adjacent end walls. This arrangement would result in a construction somewhat like that shown in FIG. 4, with the clarifier comprising a U-shaped integral one piece unit which can be positioned in an existing oxidation ditch to provide retrofit clarifier capability. It will be further understood that walls 30 and 31 may be replaced by plates, straps, braces or the like connecting the ends of angle members 24 with upstream and downstream walls 14 and 19.

As discussed hereinabove, the intrachannel clarifier of the present invention may be constructed as at 2 where channel walls 6 and 7 form the side walls of the clarifier or in the form shown at 27 where outer side walls 30 and 31 define the side walls of the tank-like clarifier. In this latter embodiment, the width of tank means 28 may be dimensioned as required so that the clarifier extends partially or completely across the flow path within channel 4 of the oxidation ditch.

Figure 8:
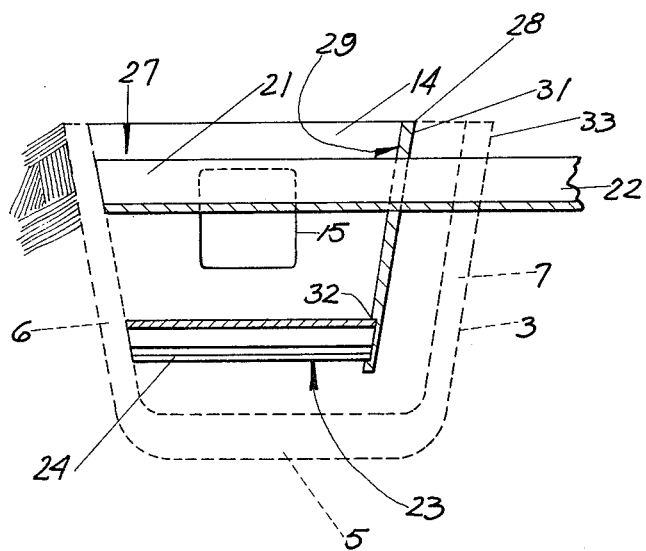
FIG. 8 is a fragmentary cross sectional end view of a third embodiment of the intrachannel clarifier of the present invention.

Alternatively, the intrachannel clarifier may be constructed as illustrated in FIG. 8. In this arrangement, where elements similar to those illustrated in connection with the embodiment of FIG. 5–FIG. 7 have been similarly designated, inner side wall 30 has been eliminated and the inner edges of end walls 14 and 15 secured directly to inner channel side wall 6. The remainder of tank means 28 is identical to that described hereinabove except that the width of the clarifier has been dimensioned so that outer clarifier wall 14 is spaced inwardly of outer channel wall 31, permitting the clarifier to extend only partially across the channel flow path. Alternatively, the width of tank means 28 may be adjusted so that the clarifier extends completely across the flow path in a manner similar to the arrangement of FIG. 5–FIG. 7.

I claim:

1. An intrachannel clarifier for clarifying waste liquid containing settlable solids for use in an aerobic wastewater treatement system of the type having means for retaining the waste liquid in a continuous substantially closed flow path, means for introducing wastewater influent into the flow path, means for removing waste sludge as mixed liquor from the flow path, and means for moving the waste liquor in a single direction in the flow path at sufficient velocity to prevent settling of the suspended solids, said clarifier comprising:

tank means positionable within said retaining means for creating a zone of relatively quiescent waste liquid in the upper portion of the tank means to permit suspended solids to settle downwardly by gravity within the quiescent zone to produce clarified waste liquid;

clarifier inlet means included in said tank means to permit entry of unclarified mixed liquor from the flow path in to the quiescent zone at a relatively slow rate; and baffle means associated with said tank means for permitting the settled solids to return from the quiescent zone to the flowing mixed liquor within the retaining means but preventing movement of excessive quantities of flowing mixed liquor into the quiescent zone, said baffle means comprising a plurality of spaced parallel slightly overlapping inverted V-shaped angle members configured to extend across the retaining means transversely of the waste liquid flow direction, each of said angle members having a pair of angularly disposed legs configured to lie across the flow path when the clarifier is positioned within the retaining means, adjacent legs of adjoining angle members being spaced to permit the passage of settled solids therebetween, said angle members being configured such that settling of suspended solids occurs in the quiescent zone above said baffle means.

2. The intrachannel clarifier according to claim 1 wherein said tank means includes upstream wall means configured to extend across the flow path within the retaining means.

3. The intrachannel clarifier according to claim 2 wherein said wall means comprises a vertically positioned wall extending completely across the flow path, and dimensioned to permit waste liquid flow beneath the lower edge of the wall and the retaining means.

4. The intrachannel clarifier according to claim 3 wherein said clarifier inlet comprises an opening extending through said wall permitting entry of unclarified waste liquid from the flow path into the quiescent zone.

5. The intrachannel clarifier according to claim 2 including a vertically positioned wall spaced downstream from said upstream wall and configured to extend across the flow path within the retaining means, said downstream wall being vertically dimensioned to permit mixed liquor flow beneath the lower edge of the wall and the retaining means.

6. The intrachannel clarifier according to claim 1 wherein the downstream leg of each angle member is longer in the flow direction than the upstream leg.

7. The intrachannel clarifier according to claim 1 wherein the upper surfaces of said angle members have sufficient pitch to prevent collection of settled solids thereon.

8. The intrachannel clarifier according to claim 1 wherein said angle members are disposed such that the upper surfaces of said legs are inclined at angles of approximately 30°–60° with respect to the horizontal to prevent collection of settled solids thereon.

9. The intrachannel clarifier according to claim 1 including a vertically positioned upstream wall configured to extend across the flow path within the retaining means, a vertically positioned wall spaced downstream from said upstream wall configured to extend across the flow path within the retaining means, said baffle means extending substantially between the lower edges of said walls, and connecting means connecting said walls and said bottom.

10. The intrachannel clarifier according to claim 9 wherein said connecting means comprises at least one generally vertical side wall extending between and attached to the vertical edges of said upstream and downstream walls, said side wall supporting one outer edge of said baffle means, and means for attaching said clarifier to the retaining means.

11. The intrachannel clarifier according to claim 9 wherein said connecting means comprises a pair of generally vertical spaced side walls extending between and attached to the vertical edges of said upstream and downstream walls, said side walls supporting the outermost edges of said baffle means, said side walls being configured to conform to and support said tank means within the retaining means.

12. The intrachannel charifier according to claim 11 wherein the retaining means is of the type forming a channel having a bottom and spaced side walls, and said channel and tank means are generally trapezoidal-shaped, said tank means being supportable within said channel such that said baffle means is spaced from the channel bottom, said clarifier being held within the channel by its own weight.

13. The intrachannel clarifier according to claim 1 including means positioned within said tank means for removing a portion of the clarified waste liquid.

14. In an aerobic system for treating wastewater containing settlable solids of the type having an oxidation ditch defining a trough-like channel having a bottom and spaced upstanding side walls for retaining the waste liquid in a continuous substantially closed flow path, means for introducing wastewater influent into the flow path, means for removing waste sludge as mixed liquor from the flow path, and means for moving the mixed liquor in a single substantially horizontal direction in the flow path at sufficient velocity to prevent settling of the suspended solids, the improvement in combination therewith comprising means positioned within said flow path for clarifying said mixed liquor, said clarifying means comprising tank means for creating a zone of relatively quiescent waste liquid in the upper portion of said channel to permit suspended solids to settle by gravity within said quiescent zone to produce clarified waste liquid, clarifier inlet means for permitting entry of unclarified mixed liquor from the flow path into the quiescent zone at a relatively slow rate, clarifier outlet means for removing a portion of the clarified waste liquid from the tank means, and baffle means associated with said tank means for permitting the settled solids to return from said quiescent zone to the flowing mixed liquor within said channel, but preventing movement of excessive quantities of flowing waste liquid into said quiescent zone, said baffle means comprising a plurality of spaced parallel slightly overlapping inverted V-shaped angle members each having a pair of angularly disposed legs extending across the flow path in spaced relationship with said channel bottom, adjoining legs of adjacent angle member being spaced to permit the passage of settled solids therebetween, said angle members being configured such that settling of suspended solids occurs in the quiescent zone above said baffle means.

15. The waste water treatment system according to claim 14 wherein said tank means includes a generally vertical wall extending across the flow path within said channel and positioned to permit mixed liquor flow between the lower edge of said wall and the bottom of said channel.

16. The waste water treatment system according to claim 15 wherein said clarifier inlet means comprises an opening in said upstream wall permitting entry of unclarified mixed liquor from said flow path into said quiescent zone.

17. The waste water treatment system according to claim 15 wherein said tank means includes a generally vertically positioned wall spaced downstream from said upstream wall extending across the flow path within said channel and positioned to permit mixed liquor flow between the lower edge of said downstream wall and the bottom of said channel.

18. The waste treatment system according to claim 17 including at least one generally vertical wall extending between and attached to the vertical edges of said upstream and downstream walls, said side wall supporting one outer edge of said baffle means, and means for attaching said clarifier to one of said channel side walls.

19. The waste water treatment system according to claim 18 wherein said clarifier side wall is spaced from the adjacent channel side wall.

20. The waste water treatment system according to claim 17 wherein said upstream and downstream walls extend completely across said flow path.

21. The wastewater treatment system according to claim 14 wherein the upper surfaces of said angle members have sufficient pitch to prevent collection of settled solids thereon.

22. The waste water treatment system according to claim 14 wherein said baffle means is postioned in spaced relationship with said channel bottom, a portion of said mixed liquor flow passing beneath said baffle means, said baffle means including means for creating a draft in association with the flowing mixed liquor to draw settled solids from said clarifier means.

23. The waste water treatment system according to claim 14 wherein the downstream leg of each angle member is longer in the flow direction than the upstream leg.

24. The waste water treatment system according to claim 23 wherein said legs are inclined at angles of approximately 30°-60° with respect to the horizontal.

25. The waste water treatment system according to claim 14 wherein said baffle means is positioned in spaced relationship with said channel bottom, a portion of said mixed liquor flow passing beneath said baffle means, said channel bottom including a deepened portion extending between the upstream and downstream boundaries of said baffle means to permit substantially unobstructed flow of mixed liquor beneath said baffle means.

26. The waste water treatment system according to claim 14 wherein said baffle means is positioned in spaced relationship with said channel bottom, a portion of said mixed liquor flow passing beneath said baffle means, said channel bottom being configured to create a slight head loss between the upstream and downstream boundaries of said baffle means.

27. In intrachannel clarifier for clarifying waste liquid containing settlable solids for use in an aerobic waste water treatment system of the type having means for retaining the waste liquid in a continuous substantially closed flow path, means for introducing waste water influent into the flow path, means for removing waste sludge as mixed liquor from the flow path, and means for moving the waste liquor in a single direction in the flow path at sufficient velocity to prevent settling of the suspended solids, said clarifier comprising:

tank means positionable within said retaining means for creating a zone of relatively quiescent waste liquid in the upper portion of the tank means to permit suspended solids to settle downwardly by gravity within the quiescent zone to produce clarifier waste liquid;

clarifier inlet means included in said tank means to permit entry of unclarified mixed liquor from the flow path into the quiescent zone at a relatively slow rate; and baffle means associated with said tank means for permitting the settled solids to return from the quiescent zone to the flowing mixed liquor within the retaining means but preventing movement of excessive quantities of flowing mixed liquor into the quiescent zone, said baffle means comprising a plurality of spaced sloping non-vertical surfaces configured to extend across the flow path substantially transversely of the waste liquid flow direction, such that settling of the suspended solids occurs in the quiescent zone above the baffle means.

28. The intrachannel clarifier according to claim 27 wherein said surfaces are inclined at angles of approximately 30°-60° with respect to the horizontal to prevent collection of solids thereon.

29. The intrachannel clarifier according to claim 27 including said retaining means.

30. The intrachannel clarifier according to claim 29 wherein said retaining means comprises an oxidation ditch defining a trough-like channel having a bottom and spaced upstanding sidewalls.

31. An intrachannel clarifier for removing suspended solids from a stream of moving fluid comprising tank means positionable within said stream to permit a portion at least of said stream to flow therebeneath including spaced upstream and downstream walls extending across the flow direction of the stream of moving fluid for creating a zone of relatively quiescent fluid within the tank means between the walls, and baffle means forming a floor extending between the lower margins of said walls, said baffle means including a plurality of spaced sloping non-vertical surfaces forming openings therebetween extending substantially transversely across the flow direction of the stream such that a portion of the fluid containing suspended solids may enter the openings between the surfaces, said baffle means being configured so that the flow velocity within the quiescent zone is insufficient to maintain solid suspension to permit the solids to settle downwardly by gravity within the quiescent zone above the baffle means and return to the stream flow beneath the clarifier through the spaces between the surfaces, and means for recovering the clarified fluid from the quiescent zone.

32. The intrachannel clarifier according to claim 31 wherein said sloped surfaces are arranged in pairs, the surfaces of each pair being angularly related to each other and joined along their upper longitudinal edges, the lower longitudinal edges of the surfaces of adjacent pairs being spaced to form said openings.

33. The intrachannel clarifier according to claim 32 wherein adjacent surfaces of adjoining pairs are overlapping.

34. The intrachannel clarifier according to claim 33 wherein said surfaces are substantially planar.

35. The intrachannel clarifier according to claim 31 wherein said baffle means comprises a plurality of inverted V-shaped angle members extending across the stream flow direction, each of said angle members having a pair of angularly disposed legs joined at their upper edges, said legs forming said surfaces, adjacent legs of adjoining angle members being separated to form said openings between said surfaces.

36. The intrachannel clarifier according to claim 35 wherein adjacent legs of adjoining angle members are slightly overlapping.

37. The intrachannel clarifier according to claim 36 wherein the downstream leg of each angle member is longer in the flow direction than the upstream leg.

38. The intrachannel clarifier according to claim 37 wherein said surfaces are substantially planar.

39. The intrachannel clarifier according to claim 31 wherein said surfaces are substantially planar.

* * * * *

UNITED STATES PATENT AND TRADEMARK OFFICE
CERTIFICATE OF CORRECTION

PATENT NO. : 4,446,018
DATED : May 1, 1984
INVENTOR(S) : Joel A. Cerwick

It is certified that error appears in the above—identified patent and that said Letters Patent is hereby corrected as shown below:

On the first page of the patent, following the designation of "Assignee", insert the following paragraph:

-- The invention described in this patent was made in the course of work under U.S. Environmental Protection Agency grant C290901. The Government of the United States has certain rights in this invention. --

Signed and Sealed this

Twenty-fifth Day of June 1985

[SEAL]

Attest:

DONALD J. QUIGG

Attesting Officer    Acting Commissioner of Patents and Trademarks